C. M. SCOTT.
AIR PUMP.
APPLICATION FILED JULY 19, 1911.
1,059,222.
Patented Apr. 15, 1913.
2 SHEETS—SHEET 1.
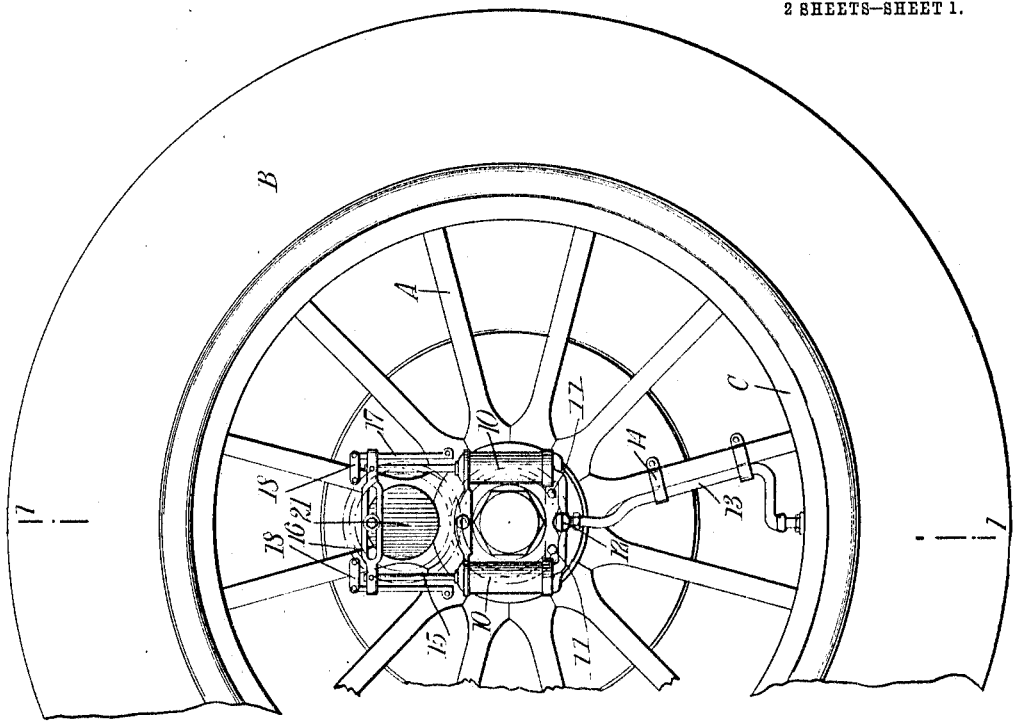
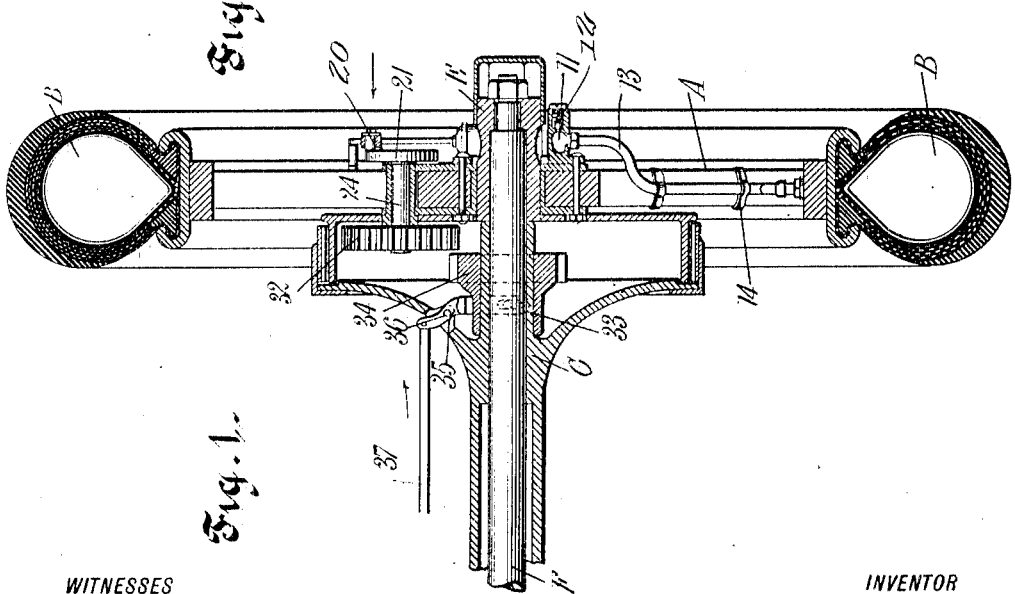
WITNESSES
INVENTOR
Charles Mack Scott
BY
ATTORNEYS

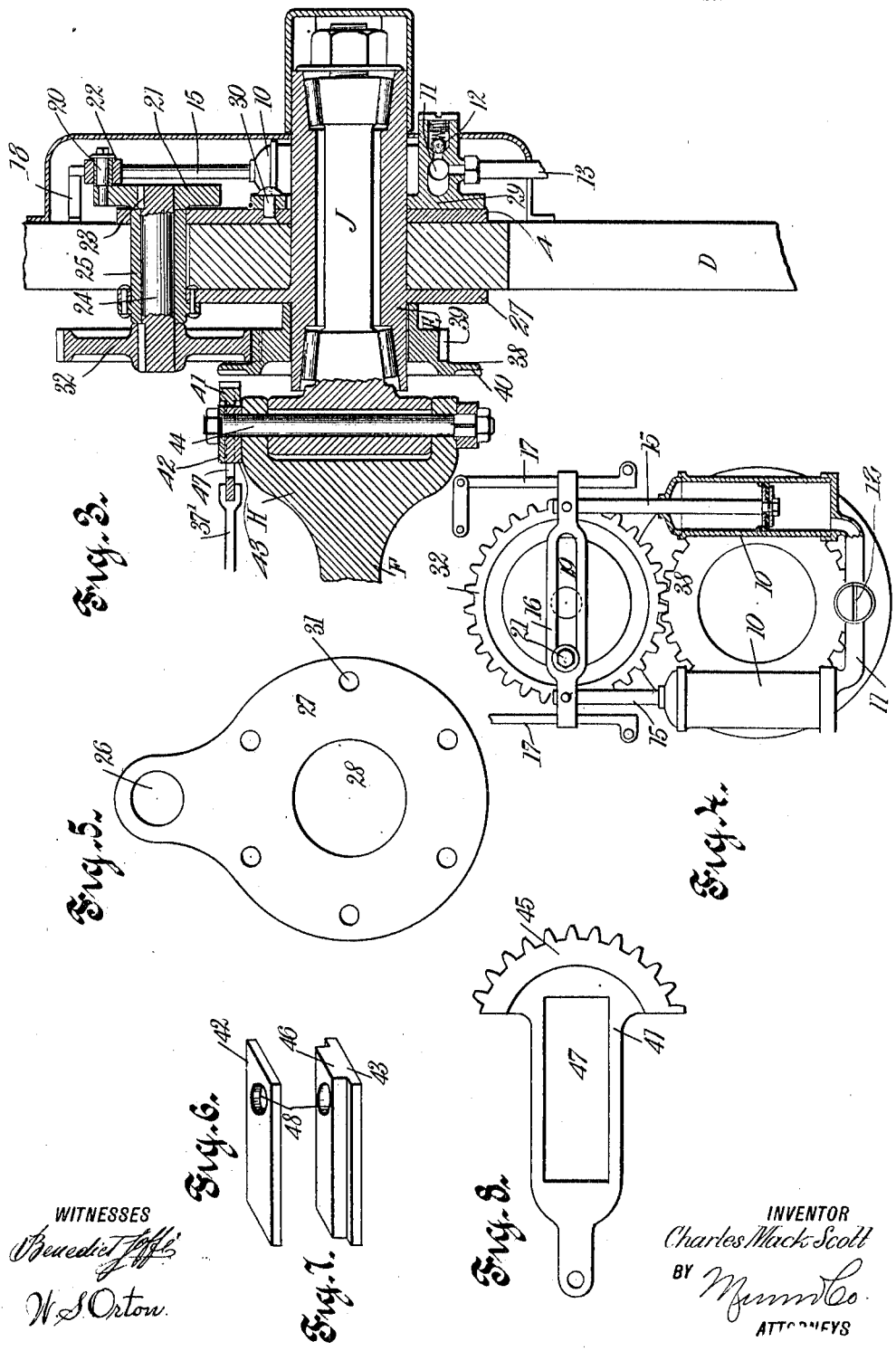

UNITED STATES PATENT OFFICE.

CHARLES MACK SCOTT, OF SAN ANGELO, TEXAS.

AIR-PUMP.

1,059,222.   Specification of Letters Patent.   Patented Apr. 15, 1913.

Application filed July 19, 1911. Serial No. 639,225.

*To all whom it may concern:*

Be it known that I, CHARLES MACK SCOTT, a citizen of the United States, and a resident of San Angelo, in the county of Tom Green and State of Texas, have invented a new and Improved Air-Pump, of which the following is a full, clear, and exact description.

My invention relates to a new and improved form of air pump attachment, and is more particularly adapted to be mounted upon a vehicle wheel.

An object of my invention is to provide an air pump mounted upon a vehicle wheel for the purpose of supplying air to the tire thereof.

I attain the above-outlined object by positioning an air pump upon a wheel with a fluid connection between the pump and the tire, said pump being actuated at will by gearing the pump piston actuating means with a stationary element on the vehicle, so that the revolving of the wheel itself will actuate the pump.

With the above and other objects in view as will more fully hereinafter appear, the present invention consists in certain novel details of construction and arrangement of parts hereinafter fully described, illustrated in the accompanying drawings, and more particularly pointed out in the appended claims.

Reference is to be had to the accompanying drawings, forming a part of this specification, in which similar characters of reference indicate corresponding parts in all the figures, and in which—

Figure 1 is a transverse sectional view taken through a preferred embodiment of my invention mounted on a rear or driving wheel of an automobile, and taken on the correspondingly numbered line in Fig. 2; Fig. 2 is a side elevation of a wheel with a preferred embodiment of my invention attached thereto looking at the device in the direction indicated by the arrow in Fig. 1; Fig. 3 is a view similar to Fig. 1 but showing the device mounted upon the front wheel of a vehicle; Fig. 4 is an enlarged detail view of a preferred form of pump; Fig. 5 is an elevation of a bearing plate adapted to fit about the hub; Figs. 6 and 7 are perspective views of the upper and the lower bearing plates, respectively, forming details of the construction shown in Fig. 3; and Fig. 8 is a plan view of a clutch mounted between the plates shown in Figs. 6 and 7.

In the several figures, I have shown an automobile wheel A of the ordinary construction carrying a pneumatic tire B on a rim C held in position by means of spokes D radiating from a hub E. As shown in Fig. 1, the wheel disclosed is the ordinary rear wheel of an automobile in which the axle F extends through the hub E and upon which is mounted the customary form of drum brake G. As shown in Fig. 3, the wheel disclosed is the ordinary front wheel of an automobile in which the axle F terminates in a steering head H, within which head is mounted the customary form of axle J, as is common with automobile wheels of this type. In other words, the pump here disclosed is applied to wheels of common construction with the necessary mechanical adaptations.

Disposed on opposite sides of the axle and on either the inside or the outside of the wheel, is a double cylinder pump 10, the bottom of each of the cylinders communicating through a pipe 11, through a valve 12 and through a pipe 13 fastened by means of clips 14 to one of the spokes D to the interior of the tire B. In order to actuate the pump, there are extending from the ends of the cylinders opposite the exhaust to the pipe 11, piston stems 15 attached adjacent opposite ends to a cam bar 16, which cam bar is held in position in a plane common to the two cylinders, by having a sliding connection on spaced-apart cam bar guides 17, the lower ends of which cam bar guides are pivoted adjacent the axle to a pair of spokes D, the upper ends of which are likewise pivoted to a pair of spokes through links 18. By this connection the stems are guided in their reciprocating movement in and out the cylinders of the pump. The cam bar 16 has a transversely-extending slot 19 therein, affording a guideway for a crank pin 20 mounted off center on the cam wheel 21, disposed between which crank pin and the sides of the slot 19 is an anti-friction roller 22. The wheel 21 is fastened by a key 23 to a shaft 24, which shaft is rotatably mounted in bearings 25, which bearings are in turn supported by passing through alined apertures 26 in oppositely disposed bearing plates 27. One of the plates, as shown in Fig. 3, is integral with the hub E, and the other of the plates, as shown more particularly in Fig. 5, is inserted over the hub E; further, the hub projects through the centrally-disposed aperture 28, and the latter-mentioned plate supports the bracket 29 upon which the pump is mounted by means of a rivet 30 passing through the bracket and through apertures 31 on said plate. Upon the end of the shaft 24 opposite the end carrying the crank wheel 21, is keyed a gear wheel 32 through which motion is transmitted to actuate the pump. It will be seen that by the construction thus far described, the pump and its attached mechanism rotate idly about the hub E, and this will be the normal condition of the device. Should it be desired, however, to inflate the tire, it will be necessary merely to cause the gear wheel 32 to revolve about a stationary gear, which will turn the gear wheel 32 on its own axle, thereby actuating the pump. The means for doing this must necessarily be varied according to whether the device is mounted on the front or on the rear wheel, and this connection will be described first with reference to the rear wheel, as shown more clearly in Fig. 1.

Slidably mounted upon a boss 33 extending toward the axle from the drum brake G is mounted a gear clutch 34, the teeth of which gear clutch are adapted to mesh with the teeth of the gear wheel 32. This clutch is actuated by a yoke lever 35 fulcrumed at 36 to a drum brake G or to any other suitable part of the vehicle, which lever is actuated by a rod 37 or other suitable connection leading to a point adjacent the operator's seat. It will be seen that by drawing the rod in the direction indicated by the arrow, the clutch 34 will engage the gear wheel 32, causing the gear wheel 32 to rotate its shaft 24 and crank wheel 21, thereby reciprocating the piston stems 15 and supplying compressed air to the tire B. When the tire has been sufficiently inflated, the clutch 34 is withdrawn from the gear wheel 32 and the pump runs idle about the hub of the wheel.

In order to afford a connection between the gear wheel 32 and the body of the vehicle, in the case of a front wheel, and at the same time, not to interfere with the steering mechanism, there is mounted on the hub E, as shown more particularly in Fig. 3, a compound gear wheel 38, one set of teeth 39 of which is permanently in mesh with the gear wheel 32, which gear wheel 38 has a set of side-facing teeth 40. In order to hold the gear wheel 38 relative to the vehicle, a segmental clutch 41 is slidably mounted upon the steering head H between guide plates 42 and 43, one of which guide plates has a block 46 at the top face thereof, which block fits within the rectangularly disposed opening 47 in the segmental clutch 41. The guide plates and the segmental clutch are held in position by means of a pivot pin 44 passing through alined apertures 48 in the plates 42 and 43, which pin forms a bearing between the axles F and J. The end of the segmental clutch 41 facing the teeth 40, is formed into a segmental end 45, the teeth of which are adapted to engage the teeth 40 on the gear 38. This clutch 41 is actuated by a rod 37' extending toward the operator. It will be seen by this construction, that the gear wheel is movable into position relative to the body of the vehicle, but due to the segmental end 45 of the clutch 41, the gear wheel 38 mounted upon the axle J may change relative to the vehicle, and through which construction the steering device will operate irrespective of whether the connection is made to the pump or whether the pump be running idle.

While a preferred embodiment of the invention has been described, it is to be understood that many changes could be made in the above construction and many apparently widely different embodiments of this invention could be made without departing from the scope thereof. It is intended that all matters contained herein in the above description or shown in the accompanying drawings, shall be interpreted as illustrative and not in a limiting sense. It is also to be understood that the language used in the following claims is intended to cover the full scope of the invention and is not to be given any narrower construction than the prior art demands, and that materials, sizes and relativities of parts are nonessential, except as called for in the claims.

Having thus described my invention, I claim as new and desire to secure by Letters Patent:

1. In combination, a wheel, a pump comprising a pair of parallelly-disposed cylinders mounted upon opposite sides of the axle of the wheel, a cam bar having a slot therein connecting the piston stems of said cylinders and at right angles to the same, a crank wheel having a pin projecting therefrom and in sliding engagement with the slot in said cam bar, a gear wheel connected to said crank wheel, and a stationary clutch adapted to engage said gear wheel, to hold the same stationary with reference to the clutch, whereby the rotation of the wheel will actuate said pump.

2. In combination with a wheel, a pump mounted on said wheel, said pump comprising a pair of parallelly disposed cylinders mounted on opposite sides of the hub, a cam bar connecting the piston stems of said cylinders, said bar having a transverse slot extending therethrough, a crank pin slidably mounted in said slot, guide bars slidably engaged by said cam bar to guide the piston rods in their cylinders; a revoluble member carrying said pin, and means controlled by the movement of the wheel for rotating said revolving member.

3. In combination, a wheel, a pair of parallelly-disposed pumps mounted on opposite sides of the hub of said wheel, said pumps having piston rods extending from the same parallel to each other, a pair of guide rods, one for each piston rod pivoted to the wheel at the end nearest the pump, a link connecting the opposite end of each rod with the wheel, a cam bar having its opposite ends in sliding engagement with the guide rods and pivoted to each of the piston rods, and a connection between said wheel and cam bar, to reciprocate the latter on said guide rods to actuate said pumps.

In testimony whereof I have signed my name to this specification in the presence of two subscribing witnesses.

CHARLES MACK SCOTT.

Witnesses:
   LEE UPTON,
   MELVIN MERICK CARRIER.